Patented Oct. 5, 1948

2,450,424

UNITED STATES PATENT OFFICE 2,450,424

MOLDABLE REACTION PRODUCTS OF SULFUR DIOXIDE AND OLEFINS

Frederick E. Frey, Bartlesville, Okla., assignor to Phillips Petroleum Company, a corporation of Delaware No Drawing. Application February 10, 1942, Serial No. 430,294

5 Claims. (Cl. 260—94.5)

This invention relates to the manufacture of polysulfone resins from olefinic compounds and sulfur dioxide, and more specifically to the production of fabricated forms thereof.

Sulfur dioxide and olefinic compounds, such as hydrocarbon olefins, are known to react in the presence of either actinic light or suitable catalysts to produce polysulfones of high molecular weight of resinous character. The resin material produced by the reaction may be dried, granulated, and fused and molded into suitable shapes by the application of heat and pressure. In the case of many olefins, the polysulfones are sufficiently soluble in sulfur dioxide to produce a viscous solution, and, with sulfur dioxide abstraction, finally a vitreous mass.

Molding of the granulated resin under heat and pressure is useful for making many mechanical forms of the resin, but in many instances it will be desirable to produce special molded shapes or large moldings with the application of little or no heating, and for such purposes, it is desirable to manipulate the resin while it contains free sulfur dioxide.

When a polysulfone resin containing dissolved sulfur dioxide is put into a molded form and exposed for a period of time to the air, a slow loss of dissolved sulfur dioxide takes place leading to the formation of cracks and the loss of strength and clearness of appearance. It is the purpose of my invention to effect the chemical binding of such sulfur dioxide and so reduce or prevent its physical loss with resultant loss in quality of molded objects.

It is the primary object of this invention to effect cohesion of polysulfone resin material under lower temperature conditions than are normally necessary for molding dry solid resins that are substantially free from chemically uncombined sulfur dioxide.

Another object of this invention is to complete the resin-forming reaction with consequent solidification in a space which impresses the desired shape to the molded object.

This invention has for a further object the production of solid resin in moldings of relatively large cross section, while avoiding the difficulty of overheating the outer portions and underheating the inner portions of the material during the molding procedure, as conventionally applied. These and additional objects and advantages will be readily apparent to persons skilled in the art by reference to the detailed description of the invention and the examples set forth below.

In one method of practicing my invention, I produce a mixture of polysulfone resin, plasticized by providing a suitable proportion of free sulfur dioxide and containing also in a finely emulsified state the exact amount of olefin required to consume the sulfur dioxide present as such, and additionally a catalyst for effecting reaction between the olefin and sulfur dioxide. It is to be understood that for effecting the reaction actinic light or suitable catalyst may be used. Of the simple hydrocarbon olefins, 1-butene and 2-butenes (cis and trans) and straight-chain olefins of higher molecular weight, or in other words straight-chain olefins having at least 4 carbon atoms to the molecule with few exceptions yield, upon reacting with sulfur dioxide, sulfone resins which are soluble in sulfur dioxide. 2-butene polysulfone dissolved in about five times its weight of sulfur dioxide produces a viscous honey-like liquid which thickens as the proportion of resin increases. At approximately 50–75 per cent of resin in solution with sulfur dioxide, the fluidity is small, that is, the plasticity of the mass is low, but the material may be masticated or kneaded readily. As the proportion of resin is increased to about 95 per cent, complete hardness is approached. By masticating a sulfur dioxide-polysulfone mixture of suitable composition for mechanical working with an amount of 2-butene rather carefully gaged to just consume all the sulfur dioxide, a stable, finely divided emulsion may be produced ranging in fluidity or plasticity from a material which can be poured to one which can be forced by pressure and moderate heat into a mold. With the aid of a catalyst, the material, after being forced into a mold, is allowed to undergo reaction whereby both olefin and sulfur dioxide are consumed. The production of a very finely divided emulsion of hydrocarbons in the resin phase is desirable to obtain homogeneous moldings. A fine dispersion not subject to settling under gravity during the final resinification is best obtained by treating a mixture containing a high content of the viscosity-imparting polysulfone. A suitable mixture for masticating or kneading may be produced either by admixing previously manufactured resin with the reactants (sulfur dioxide and olefin or its equivalent) or by carrying the reaction of olefin and sulfur dioxide to that point giving the desired mechanical characteristics for the olefin-dispersing operation. Olefins suitable for the purpose, that is, olefins which are to be added to prepared resins, according to one method of practicing the present invention, may be any of those which yield resinous polysulfones which are plasticized by sulfur dioxide. Many olefins, such as isobutylene, yield resins not readily plasticized by sulfur dioxide, but such materials may be incorporated through copolymerization with the plasticizable species to produce polymers capable of sulfur dioxide plasticizing. In this process, the substance which is to be added to prepared resins to react with sulfur dioxide that is also added to such prepared resins for the purpose of effecting plasticization, according to one method of practicing the present invention, may consist either wholly or partly of organic compounds, other than simple hydrocarbons, which possess the ethylenic linkage and which are found to form polysulfones having at least a little solvent power for sulfur dioxide.

Such substances, which may be used for complete or partial replacement of olefins, are aliphatic sulfones such as are specified hereinafter.

The solubility of olefins in mixtures containing sulfur dioxide and prepared resins is usually low, and, accordingly, emulsification of the materials to a rather small particle size is required in order to insure homogeneity on completion of the resin-forming reaction.

My invention also contemplates bringing the resin-forming reaction to completion with the consumption of any chemically uncombined sulfur dioxide by means of unsaturated organic compounds which possess marked degrees of physical solubility in the particular resins and which are capable of forming polysulfones with sulfur dioxide. By incorporation of such an unsaturated organic compound, resinification may be completed without the necessity for maintaining an emulsified condition and without so closely controlling the amount required, since the soluble unsaturated organic compound may be present in amounts either just sufficient or somewhat in excess of that needed to consume all of the free sulfur dioxide. Suitable compounds for this purpose, for example, are organic sulfones containing an ethylenic group, such as methyl allyl sulfone ($CH_3-SO_2-CH_2CH=CH_2$) or methyl butenyl sulfone ($CH_3-SO_2-CH_2CH_2CH=CH_2$) in which the double bond is preferably in the position most remote from the sulfur. Olefins containing nitrogen, sulfur, oxygen, and halogen in many cases, I have found, show a marked solubility in the resin phase proper and the most suitable of these are readily found by trial. In the use of a soluble unsaturated organic compound, according to one process of practicing my invention, it may be added at some stage in the procedures above described, accompanying a simple hydrocarbon olefin reactant. The process may alternatively be carried out by admixing the soluble unsaturated organic compound with resin and sulfur dioxide, after which the resinification is allowed to complete itself. In such a case the soluble unsaturated organic compound is relied upon to consume all the sulfur dioxide remaining with the resin from a polysulfone forming step, or sulfur dioxide which was added to a previously purified and dried resin for the purpose of imparting plasticity thereto.

The proportion of chemically uncombined sulfur dioxide associated with the resin usually dictates the amount of olefin reactant required, and it may be five per cent or less if a resin molding material capable of being deformed or extruded at some temperature below a dry molding temperature or decomposing temperature is desired. A mixture to be handled as a fluid at ordinary or subatmospheric or moderately elevated temperatures will ordinarily contain from 5 to 50 per cent of chemically uncombined sulfur dioxide.

Since sulfur dioxide and the simpler olefins are normally gaseous, special precautions may be required to avoid a change in composition which would lead on final resinification to a non-homogeneous molding. This ordinarily requires operating under high applied pressure, or in confined spaces which prevent the dispersion or evaporation of reactants, or operating at subatmospheric temperatures at which the vapor pressures of the reactants are low. These also may be resorted to to maintain the compositions of the mixtures prior to final resinification within the rather rigorous limits allowable, as taught in the foregoing description.

Examples of methods of practicing my invention are as follows:

Example I 2-butene and sulfur dioxide are mixed in liquid phase at room temperature in such proportion as to effect mutual consumption, virtually a mol for mol ratio. Lithium nitrate, 0.05 per cent by weight of the mixture, is dissolved therein, and resin formation then begins. At the outset, the ingredients form a single homogeneous phase, but as the reaction proceeds, two phases result, a heavy phase consisting of sulfur dioxide and polysulfone and a light phase consisting of 2-butene and sulfur dioxide. The mixture is subjected to continuous stirring and kneading and the viscosity increases as the reaction proceeds with the production of a finely divided phase rich in 2-butene in emulsion with the viscous polysulfone-rich phase. When the viscosity of the mixture has become too high for further mechanical working, it is discharged into a receiving vessel in which without further agitation the reaction is allowed to go to virtual completion. Shrinkage in volume takes place during this period with the formation of a certain amount of gas phase which results in a surface inhomogeneity of the resin.

The viscous mixture instead of being discharged into an open vessel may be discharged directly to a closed mold whereby the development of vapor spaces is avoided and a homogeneous molding is obtained.

Example II

A mixture is prepared that consists of 80 parts by weight of 2-butene polysulfone resin, 0.05 part by weight of lithium nitrate, 20 parts by weight of sulfur dioxide, and an amount of methyl 3-butenyl sulfone ($CH_3-SO_2-CH_2CH_2CH=CH_2$) equal to 105 mole per cent of the sulfur dioxide. The mixture is kneaded until thoroughly homogenized and transferred to a vessel or mold wherein reaction goes to completion without further agitation.

In preparing polysulfone resins in accordance with my invention, suitable plasticizing materials may be added if desired.

While the invention has been described in detail with specific examples, such examples are merely illustrative and are not given as limitations, since other modifications within the spirit and scope of the invention will be apparent to those skilled in the art. Hence, the invention is to be understood as limited only as indicated in the appended claims in which the intent is to set forth all the novelty over the prior art.

I claim:
1. The process of producing a molded product comprising a reaction product of sulfur dioxide and 2-butene which comprises forming a resinous reaction product of approximately equimolecular proportions of 2-butene and sulfur dioxide containing sufficient chemically uncombined sulfur dioxide to yield a substantially plastic mass and containing some of the 2-butene in unreacted condition, intimately admixing the resinous product with the uncombined sulfur dioxide and unreacted 2-butene and a catalyst consisting of lithium nitrate for promoting the reaction of 2-butene and sulfur dioxide, and thereafter subjecting the resulting mixture to molding conditions effecting the setting thereof.

2. The process of producing a molded product comprising a reaction product of sulfur dioxide and a 2-butene, which comprises reacting approximately equimolecular proportions of a 2-butene and sulfur dioxide in the presence of lithium nitrate until a resinous mass of substantial plasticity at room temperature and which contains substantial amounts of chemically uncombined sulfur dioxide and the 2-butene is formed, and thereafter transferring said resinous mass to a mold and subjecting it to molding conditions effecting the setting thereof.

3. The process of producing a molded product comprising a resinous reaction product of sulfur dioxide and a straight chain olefin having at least four carbon atoms to the molecule which forms with sulfur dioxide a resinous product that is normally soluble in sulfur dioxide, which comprises dissolving such a resinous product in a substantial amount of sulfur dioxide to yield a mass that is substantially plastic at room temperature and adding thereto a straight-chain olefin having at least four carbon atoms to the molecule and reactive with sulfur dioxide in an amount sufficient to combine with the chemically uncombined sulfur dioxide, and a catalyst for promoting the reaction of said olefin and sulfur dioxide, and thereafter subjecting said mass to molding conditions effecting the setting thereof.

4. A process according to claim 3 wherein chemically uncombined sulfur dioxide is present in the proportion of from about 5 to 50 weight per cent.

5. A process according to claim 3 wherein the added olefin reacted with uncombined sulfur dioxide is butene-1.

FREDERICK E. FREY.

REFERENCES CITED

The following references are of record in the file of this patent:

UNITED STATES PATENTS

| Number | Name | Date |
|---|---|---|
| 2,136,389 | Marvel, et al. | Nov. 15, 1938 |
| 2,184,295 | Frey, et al. | Dec. 26, 1939 |
| 2,293,023 | Hills, et al. | Aug. 11, 1942 |